(12) United States Patent
Su

(10) Patent No.: US 7,162,143 B2
(45) Date of Patent: Jan. 9, 2007

(54) SIMPLIFIED METHOD AND RELATED DEVICE FOR AUTHENTICATION OF DVD SYSTEM

(75) Inventor: Hao-Kuen Su, Taipei Hsien (TW)

(73) Assignee: VIA Technologies Inc., Taipei Hsien (TW)

( * ) Notice: Subject to any disclaimer, the term of this patent is extended or adjusted under 35 U.S.C. 154(b) by 1101 days.

(21) Appl. No.: 10/064,043

(22) Filed: Jun. 4, 2002

(65) Prior Publication Data

US 2003/0031466 A1 Feb. 13, 2003

(30) Foreign Application Priority Data

Aug. 10, 2001 (TW) ............................... 90119697 A

(51) Int. Cl.
  *H04L 9/00* (2006.01)
  *G06F 13/00* (2006.01)
(52) U.S. Cl. ............................... 386/46; 726/16; 726/17; 726/21; 726/27; 380/46
(58) Field of Classification Search ................... 386/94, 386/95; 380/46; 726/16, 17, 19, 21, 27, 726/29
See application file for complete search history.

(56) References Cited

U.S. PATENT DOCUMENTS

| 6,467,005 B1* | 10/2002 | Ito et al. ......................... 726/26 |
| 2003/0009668 A1* | 1/2003 | Chan et al. .................. 713/171 |
| 2006/0056624 A1* | 3/2006 | Ishiguro et al. ............... 380/46 |

* cited by examiner

*Primary Examiner*—Thai Q. Tran
*Assistant Examiner*—Mishawn Dunn
(74) *Attorney, Agent, or Firm*—Winston Hsu

(57) ABSTRACT

A method and related device are used for a DVD (Digital Versatile Disk) system to authenticate the DVD system by generating an authentication code corresponding to an inquiring code. The inquiring code has a first portion and a second portion both having at least one bit. The method comprises: generating a first sub-authentication code according to only the first portion of the inquiring code, generating a second sub-authentication code according to only the second portion of the inquiring code, and combining the first sub-authentication code and the second sub-authentication code to form the authentication code.

8 Claims, 12 Drawing Sheets

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 4C | DC | EC | BC | 8C | 9C | AC | FC | CC | 5C | 6C | 3C | 0C | 1C | 2C | 7C |
| 1 | 41 | D1 | E1 | B1 | 81 | 91 | A1 | F1 | C1 | 51 | 61 | 31 | 01 | 11 | 21 | 71 |
| 2 | 42 | D2 | E2 | B2 | 82 | 92 | A2 | F2 | C2 | 52 | 62 | 32 | 02 | 12 | 22 | 72 |
| 3 | 43 | D3 | E3 | B3 | 83 | 93 | A3 | F3 | C3 | 53 | 63 | 33 | 03 | 13 | 23 | 73 |
| 4 | 40 | D0 | E0 | B0 | 80 | 90 | A0 | F0 | C0 | 50 | 60 | 30 | 00 | 10 | 20 | 70 |
| 5 | 4D | DD | ED | BD | 8D | 9D | AD | FD | CD | 5D | 6D | 3D | 0D | 1D | 2D | 7D |
| 6 | 4E | DE | EE | BE | 8E | 9E | AE | FE | CE | 5E | 6E | 3E | 0E | 1E | 2E | 7E |
| 7 | 4F | DF | EF | BF | 8F | 9F | AF | FF | CF | 5F | 6F | 3F | 0F | 1F | 2F | 7F |
| 8 | 44 | D4 | E4 | B4 | 84 | 94 | A4 | F4 | C4 | 54 | 64 | 34 | 04 | 14 | 24 | 74 |
| 9 | 49 | D9 | E9 | B9 | 89 | 99 | A9 | F9 | C9 | 59 | 69 | 39 | 09 | 19 | 29 | 79 |
| A | 4A | DA | EA | BA | 8A | 9A | AA | FA | CA | 5A | 6A | 3A | 0A | 1A | 2A | 7A |
| B | 4B | DB | EB | BB | 8B | 9B | AB | FB | CB | 5B | 6B | 3B | 0B | 1B | 2B | 7B |
| C | 48 | D8 | E8 | B8 | 88 | 98 | A8 | F8 | C8 | 58 | 68 | 38 | 08 | 18 | 28 | 78 |
| D | 45 | D5 | E5 | B5 | 85 | 95 | A5 | F5 | C5 | 55 | 65 | 35 | 05 | 15 | 25 | 75 |
| E | 46 | D6 | E6 | B6 | 86 | 96 | A6 | F6 | C6 | 56 | 66 | 36 | 06 | 16 | 26 | 76 |
| F | 47 | D7 | E7 | B7 | 87 | 97 | A7 | F7 | C7 | 57 | 67 | 37 | 07 | 17 | 27 | 77 |

Fig. 3 Prior art

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | C4 | 44 | 04 | 84 | CC | 4C | 0C | 8C | C8 | 48 | 08 | 88 | C0 | 40 | 00 | 80 |
| 1 | 24 | A4 | E4 | 64 | 2C | AC | EC | 6C | 28 | A8 | E8 | 68 | 20 | A0 | E0 | 60 |
| 2 | 14 | 94 | D4 | 54 | 1C | 9C | DC | 5C | 18 | 98 | D8 | 58 | 10 | 90 | D0 | 50 |
| 3 | 34 | B4 | F4 | 74 | 3C | BC | FC | 7C | 38 | B8 | F8 | 78 | 30 | B0 | F0 | 70 |
| 4 | CE | 4E | 0E | 8E | C6 | 46 | 06 | 86 | CA | 4A | 0A | 8A | C2 | 42 | 02 | 82 |
| 5 | 2E | AE | EE | 6E | 26 | A6 | E6 | 66 | 2A | AA | EA | 6A | 22 | A2 | E2 | 62 |
| 6 | 1E | 9E | DE | 5E | 16 | 96 | D6 | 56 | 1A | 9A | DA | 5A | 12 | 92 | D2 | 52 |
| 7 | 3E | BE | FE | 7E | 36 | B6 | F6 | 76 | 3A | BA | FA | 7A | 32 | B2 | F2 | 72 |
| 8 | CD | 4D | 0D | 8D | C5 | 45 | 05 | 85 | C9 | 49 | 09 | 89 | C1 | 41 | 01 | 81 |
| 9 | 2D | AD | ED | 6D | 25 | A5 | E5 | 65 | 29 | A9 | E9 | 69 | 21 | A1 | E1 | 61 |
| A | 1D | 9D | DD | 5D | 15 | 95 | D5 | 55 | 19 | 99 | D9 | 59 | 11 | 91 | D1 | 51 |
| B | 3D | BD | FD | 7D | 35 | B5 | F5 | 75 | 39 | B9 | F9 | 79 | 31 | B1 | F1 | 71 |
| C | CB | 4B | 0B | 8B | C3 | 43 | 03 | 83 | CF | 4F | 0F | 8F | C7 | 47 | 07 | 87 |
| D | 2B | AB | EB | 6B | 23 | A3 | E3 | 63 | 2F | AF | EF | 6F | 27 | A7 | E7 | 67 |
| E | 1B | 9B | DB | 5B | 13 | 93 | D3 | 53 | 1F | 9F | DF | 5F | 17 | 97 | D7 | 57 |
| F | 3B | BB | FB | 7B | 33 | B3 | F3 | 73 | 3F | BF | FF | 7F | 37 | B7 | F7 | 77 |

SIMPLIFIED METHOD AND RELATED DEVICE FOR AUTHENTICATION OF DVD SYSTEM

BACKGROUND OF INVENTION

1. Field of the Invention

The invention relates to an authentication method and related device used in a digital versatile disk (DVD) system, and more particularly, to a method and related device using several independent mapping relationships to simplify the encoding process during authentication.

2. Description of the Prior Art

Since the technology of digital versatile disks (DVDs) is developed, DVD shave become one of the most important storage media of information industry. The capacity and density of DVDs are far more than those of current compact disks (CDs). They are capable of storing a large capacity of video and multi-media data, enriching lives of people, and furthermore, recording large quantities of information and knowledge for the basis of the development of technology.

The data stored in DVDs can be read by DVD-Rom (read only memory) drives. To maintain the legitimacy of reading the DVD title, an authentication mechanism has been set in constituting the specification of the DVD system. Please refer to FIG. 1. FIG. 1 is a function block diagram of a disk-play platform 10 cooperating with a DVD drive 14 for playing a DVD. The disk-play platform 10 of a DVD system could be a personal computer (PC). a master controller 12 of the disk-play platform 10 could be a DVD data decoding circuit in hardware, or a DVD playing software performed by the disk-play platform 10. The disk-play platform 10 controls the DVD drive 14 to read the data of the DVD. For avoiding the illegal use of the DVD, the master controller 12 will confirm the legality of the DVD drive 14. The authentication mechanism is as follows. The master controller 12 first sends an inquiring code 16 to the DVD drive 14. Then the DVD drive 14 encodes the inquiring code 16 into an authentication code 18 according to a regulative encoding method and responds to the master controller 12 with the authentication code 18. The master controller 12 checks the authentication code 18 given by the DVD drive 14 to determine whether the DVD drive 14 is legal. When the DVD drive 14 passes in authentication, it sends another inquiring code to authenticate the master controller 12. Then the master controller 12 performs a procedure shown in FIG. 2 to generate a corresponding authentication code according to the inquiring code sent by the DVD drive 14 and sends back to the DVD drive 14 so as to authenticate that the master controller 12 is also legal . After the above-mentioned mutual authentication process, the DVD drive 14 further reads the authenticated data of the DVD for authenticating the master controller 12 (the DVD drive 14 sends another inquiring code and checks the corresponding authentication code generated and sent back by the master controller 12). Only DVD systems that pass the above-mentioned authentication are capable of reading the data of DVDs correctly.

Please refer to FIG. 2. FIG. 2 is a schematic diagram of the procedure of the DVD drive 14 generating the authentication code 18 corresponding to the inquiring code 16. According to the specification of DVD system, the inquiring code 16 generated by the master controller 12 is encoded by a pre-procedure 22. Then the encoded result from the pre-procedure 22 is further mapped to another code according to a pre-table 24. After another encoding by a mid-procedure 26, the encoded result is again mapped to another code according to a post-table 28. Finally, the authentication code 18 is generated by a post-procedure 30. The pre-procedure 22, the mid-procedure 26, and the post-procedure 30 are defined in the specification of the DVD system, and the detailed information is well known in the industry field. For brevity, further details are omitted here. Please refer to FIG. 3 and FIG. 4 for showing the mapping of the pre-table 24 and the post-table 28.

FIG. 3 and FIG. 4 respectively show the table look-up relationship set up by the pre-table 24 and the post-table 28. The inquiring code 16 is eight bits when inputted into the pre-table 24 and the post-table 30. The mapping result from the pre-table 24 and the post-table 30 are also 8 bits. For convenience, all numbers shown in FIG. 3 and FIG. 4 are hexadecimal (In other words, the numbers of 0, 1, 2, 3, 4, 5, 6, 7, 8, 9, A, B, C, D, E, F shown in FIG. 3 and FIG. 4 respectively represent the decimal numbers of 0, 1, 2, 3, 4, 5, 6, 7, 8, 9, 10, 11, 12, 13, 14, 15). The most significant bit (MSB) is used as the $7^{th}$ bit, and the least significant bit (LSB) is used as $0^{th}$ bit. The row 24A shown in FIG. 3 includes sixteen kinds of combinations of the $7^{th}$ bit to the $4^{th}$ bit of the inquiring code inputted into the table 24, and the column 24B shown in FIG. 3 includes sixteen kinds of combinations of the $3^{rd}$ bit to the $0^{th}$ bit of the inquiring code inputted into the table 24. A numeral composed of two hexadecimal numbers at a junction of the row 24B and the column 24A represent the output according to the pre-table 24. For example, if an inquiring code inputted into the pre-table 24 is 00 (hexadecimal), then the inquiring code is mapped to 4C (hexadecimal) according to the pre-table 24 shown in FIG. 3. As well, if the inputted inquiring code is 9A, then the pre-table 24 outputs 5A. Based on the same principle, the row 28A shown in FIG. 4 includes sixteen kinds of combinations of the $7^{th}$ bit to the $4^{th}$ bit of the input of the post-table 28, and the column 28B includes sixteen kinds of combinations of the 3rd bit to the $0^{th}$ bit of the input of the post-table 28. An output, which is composed of two hexadecimal numbers, of the post-table 28 is at a junction of the row 28A and the column 28B. For example, if an input inquiring code is 31 (hexadecimal), then the inquiring code is mapped to 64 (hexadecimal) as an output according to the post-table 28 shown in FIG. 4. As well, if the inputted inquiring code is 8E (hexadecimal), then the inquiring code is mapped to 1F (hexadecimal) according to the post-table 28.

In the prior DVD drives, the pre-table 24 and the post-table 28 shown in FIG. 3 and FIG. 4 are directly implemented by a logic circuit. In other words, a designed logic circuit composed of many logic gates is formed to implement table look-up relationships set by the above-mentioned two tables. An inquiring code in the form of digital signal is inputted into the logic circuit. After the operation of the logic circuit, the inquiring code is mapped to an output in the form of a digital signal according to the pre-table (or post-table). However, the larger and more complex the table, the more logic gates are required. As shown in FIG. 3 and FIG. 4, the pre-table 24 and the post-table 28 defined in the specification of the DVD system are used to deal with all 256 kinds of combinations of an eight-bit input mapped to an eight-bit output. In the prior art, the pre-table 24 and the post-table 28 shown in FIG. 3 and FIG. 4 are directly implemented by a logic circuit, and therefore, the logic circuit is completed and the gate count is great. For containing a large number of logic gates and a complex layout, the logic circuit used to implement the pre-table and the post-table occupies some layout area and also consumes great power, which results in bad effects on the integration and the energy efficiency of DVD drive circuits. In addition, every logic gate brings a specified gate delay, so the more logic circuits used, the lower the operating efficiency of the logic circuit is. Furthermore, for ensuring normal operation of the logic circuit used for implementing the pre-table and the post-table, the logic circuit must be tested during manufacturing processes.

The prior art directly calculates 256 kinds of combinations included in the pre-table and the post-table. Therefore, all 256 kinds of combinations must be tested during manufacturing processes, which wastes time and increases the production cost.

SUMMARY OF INVENTION

It is therefore a primary objective of the claimed invention to provide a method and related device for substantially simplifying the performance of the pre-table and the post-table to solve the above-mentioned problem. The pre-table and post-table used in the DVD authentication process respectively map an 8-bit code to another 8-bit code. That is, 256 mapping relations should be implemented to realize each of the pre-table and the post-table. Particularly, the hardware designed to realize the 256 mapping relations for each of the two tables becomes complex, and needs more area for practical circuit layout.

The claimed invention discloses a novel method to simplify the realization of the pre-table and post-table. Each table is realized by two sub-tables. The original 8-bit code used in authentication is separated into two portions of 4-bits each. In addition, each of the sub-tables maps the 4-bit portion to another 4-bit output code using only 16 mapping relations. Then the 4-bit output codes of the two sub-tables that are used to realize the pre-table or the post-table are combined to obtain a result 8-bit code. The mapping relationship between the original 8-bit code and the result 8-bit code meets that defined by the pre-table or the post table. In other words, the original pre-table or the post-table with 256 mapping relations can be realized by only 32 mapping relations (16 mapping relations for each sub-table) according to the disclosed method.

It is therefore a primary objective of the claimed invention to provide a method for substantially simplifying the realization of the pre-table and the post-table. Also, according to the disclosed method, the hardware circuit for realizing the pre-table and post-table can be implemented using fewer logic gates so as to lower cost and time for designing, manufacturing and verifying such circuit. Also, the layout area and power dissipation can be reduced.

BRIEF DESCRIPTION OF DRAWINGS

FIG. 3 is a schematic diagram of a pre-table shown in FIG. 2.

FIG. 4 is a schematic diagram of a post-table shown in FIG. 2.

FIG. 5A and FIG. 5B respectively indicate two sub-tables used for calculating the pre-table shown in FIG. 3 according to the present invention.

DETAILED DESCRIPTION

In the present invention, pre-table and post-table defined in the specification of the DVD system are implemented by independent sub-tables. In the prior method, an 8-bit input is directly mapped to an 8-bit output according to the table look-up relationships. In the present invention, a specified method is used to divide the 8-bit input code into a first 4-bit portion and a second 4-bit portion. The first portion and the second portion respectively form a first 4-bit sub-output code and a second 4-bit sub-output codeaccording a table look-up relationship set up by a sub-table. Consequently, an 8-bit output code is formed by combining the first sub-output code and the second suboutput code. The relationship between the output code and the original input code conforms to the pre-table or the post-table defined in the specification of the DVD system.

Figure 1:
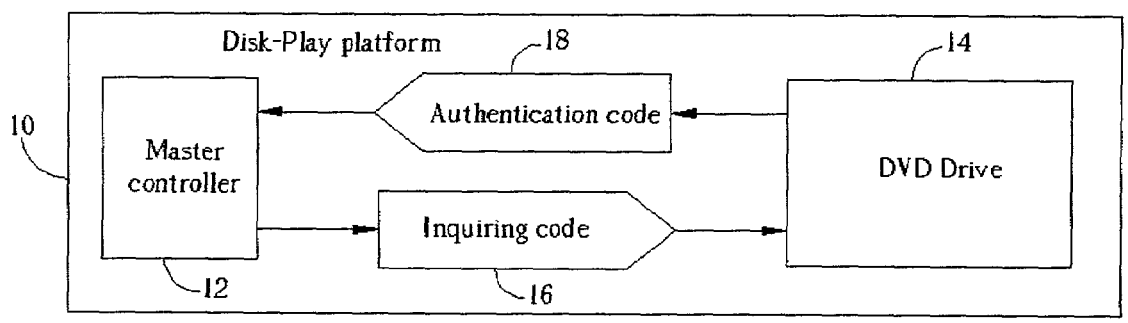
FIG. 1 is a schematic diagram of a DVD drive used in a disk-play platform.
Figure 2:
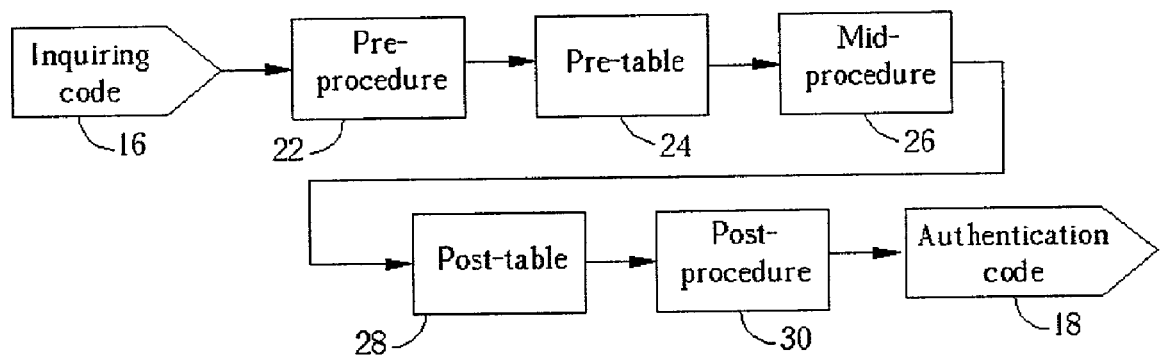
FIG. 2 is a schematic diagram of an authentication process of a DVD drive.
Figure 5A:
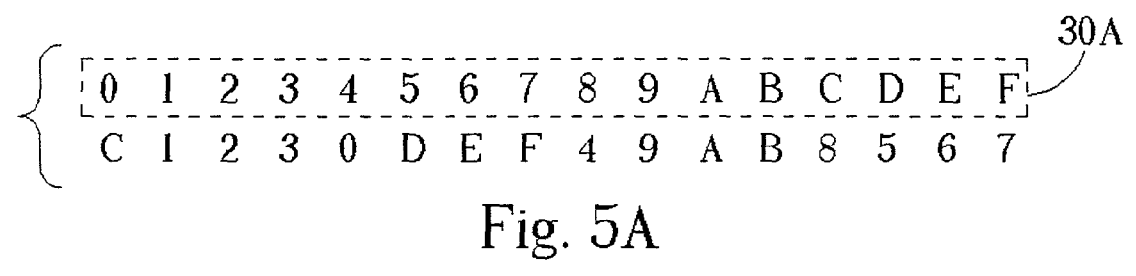
Figure 5B:
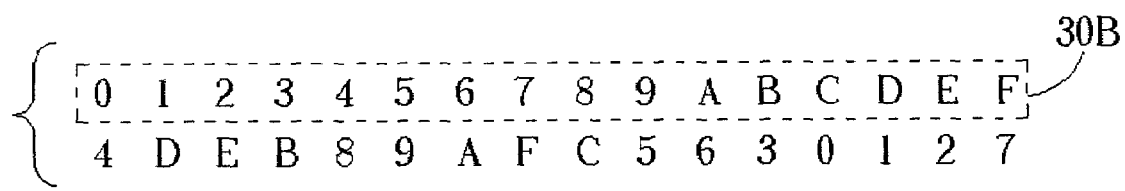

Please refer to FIG. 5A and FIG. 5B. FIG. 5A and FIG. 5B respectively indicate the two sub-tables used for implementing the pre-table according to the present invention.All numbers shown in FIG. 5A and FIG. 5B are hexadecimal numbers. To implementthe pre-table, in which an 8-bit input is mapped to an 8-bit output, the input code is first divided into a first 4-bit portion and a second 4-bit portion. The most significant bit (MSB) is used as the $7^{th}$ bit, and the least significant bit (LSB) is used as $0^{th}$ bit. The first portion is composed of the $3^{rd}$ bit to the $0^{th}$ bit of the input code, and the second portion is composed of the $7^{th}$ bit to the $4^{th}$ bit of the input code. The first sub-output code corresponding to the first portion is composed of the $3^{rd}$ bit to the $0^{th}$ bit of the 8-bit output code, and the second sub-output code corresponding to the second portion is composed of the $7^{th}$ bit to the $4^{th}$ bit of the output code. The row 30A shown in FIG. 5A includes all sixteen kinds of combinations of the first portion containing four bits. The sub-table shown in FIG. 5A indicates table look-up relationships in which the first portion is mapped to the first sub-output code. For example, if the first portion of the input code is 0 (hexadecimal), then the corresponding first sub-output code is C (hexadecimal); if the first portion is 5 (hexadecimal), then the corresponding first sub-output code is D (hexadecimal), and so on. As well, the second portion of the input code is mapped to a second sub-output code according to the sub-table shown in FIG. 5B. The row 30B shown in FIG. 5B includes all sixteen kinds of combinations of the second portion containing four bits. According to the FIG. 5B, if the second portion of the input code is 0 (hexadecimal), then the corresponding second sub-output code is 4 (hexadecimal); if the second portion is 7 (hexadecimal), then the corresponding second sub-output code is F (hexadecimal), and so on.

The processes of the present invention using the sub-tables shown in FIG. 5A and FIG. 5B for calculating the pre-table are described as follows. For example, an input code "9A" (eight bits, hexadecimal) is first divided into a first portion composed of "A" and a second portion composed of "9" for obtaining an output code according to the pre-table. According to the sub-table shown in FIG. 5A, a first sub-output code is "A". As well, the second portion composed of "9 is mapped to a second sub-output code "5" according to the sub-table shown in FIG. 5B. Combining the second sub-output code with the first sub-output code forms the output code "5A". The output code conforms to the table look-up relationship set up bythe pre-table shown in FIG. 3 (the input code "9A" is mapped to the output "5A" according to the pre-table shown in FIG. 3). For another example, if an input code is "00", then the both first portion and the second portion is "0". According to FIG. 5A and FIG. 5B, the first and the second sub-output codes are respectively "C and "4". Combining the second sub-output code with the first sub-output code forms the output code "4C". The output code conforms to table look-up relationships defined bythe pre-table shown in FIG. 3 (the input code "00" is mapped to the output "4C" according to the pre-table shown in FIG. 3).

Figure 6A:
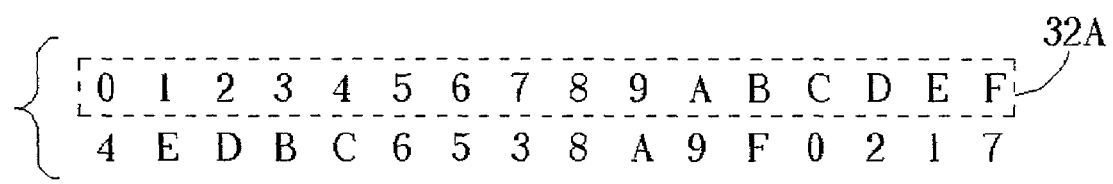
FIG. 6A and FIG. 6B respectively indicate two sub-tables used for calculating the post-table shown in FIG. 4 according to the present invention.
Figure 6B:
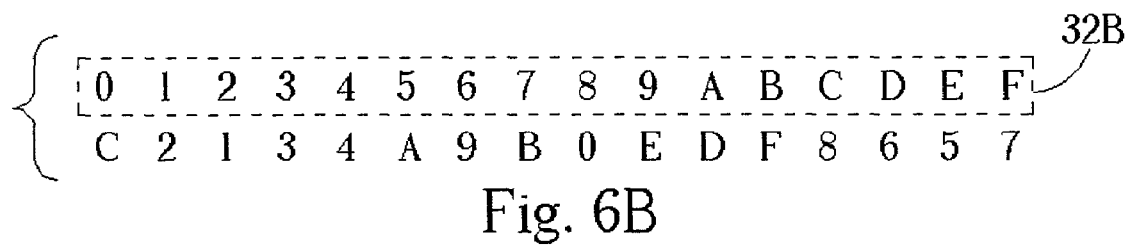

Based on the above-mentioned principle, the present invention also uses two sub-tables for implementing the post-table shown in FIG. 4. Please refer to FIG. 6A and FIG. 6B. FIG. 6A and FIG. 6B respectively indicate the two sub-tables used for implementing the post-table shown in FIG. 4 according to the present invention, and all the numbers shown in FIG. 6A and FIG. 6B are hexadecimal numbers. Different from the above-mentioned method of implementing the pre-table, now the first 4-bit portion is composed of the $7^{th}$, $6^{th}$, $3^{rd}$, and $2^{nd}$ bit of the 8-bit input code, and the second 4-bit portion is composed of the $5^{th}$, $4^{th}$, $1^{st}$ and $0^{th}$ bit of the input code. The first sub-output code corresponding to the first portion of the input code is the $3^{rd}$ bit to the $0^{th}$ bit of the 8-bit output code, and the second sub-output code is composed of the $7^{th}$ bit to the $4^{th}$ bit of the output code. Similar to FIG. 5A and FIG. 5B, the row 32A shown in FIG. 6A includes all sixteen kinds of combinations of the first portion, and the first portion is mapped to the first sub-output code according to the sub-table shown in FIG. 6A. As well, the row 32B shown in FIG. 6B includes all sixteen kinds of combinations of the second portion of the input code, and the second portion is mapped to the second sub-output code according to the sub-table shown in FIG. 6B.

An example for illustrating the processes of the present invention implementing the post-table shown in FIG. 4 is described as follows. An 8-bit input code is "31" (hexadecimal), which is also represented as "00110001" (arranged from the $7^{th}$ bit to the $0^{th}$ bit) in binary. Taking the $7^{th}$, $6^{th}$, $3^{rd}$ and $2^{nd}$ bit of the input code as a first portion, so the first portion is composed of "0000" in binary and is also represented as a hexadecimal number of "0". As well, taking the $5^{th}$, $4^{th}$, $1^{st}$ and $0^{th}$ bit of the input code as a second portion, so the second portion is composed of "1101" in binary and is also represented as a hexadecimal number of "D". According to the sub-table shown in FIG. 6A, the first portion "0" is mapped to the first sub-output code "4" (hexadecimal), and the second portion "D" is mapped to the second sub-output code "6" according to the sub-table shown in FIG. 6B. Combining the first sub-output code with the second sub-output code forms the complete 8-bit output code "64", which conforms to the table look-up relationship defined by the post-table shown in FIG. 4. For another example, an input code is hexadecimal numbers "8E", which is also represented as "10001110" in binary. The first portion is composed of "1011" in binary (also represented as a hexadecimal number of "B"), and the second portion is composed of "0010" in binary (also represented as a hexadecimal number of "2"). According to the sub-tables shown in FIG. 6A and FIG. 6B respectively, the first sub-output code is "F" (hexadecimal) and the second sub-output code is "1" (hexadecimal). Combining the first sub-output code with the second sub-output code forms the complete output code "1F", just as the input code "8E" mapped to the output code "1F" according to the post-table shown in FIG. 4. According to the above-mentioned description of the sub-tables in the present invention, one skilled person can easily prove that the two sub-tables disclosed by the present invention in the FIG. 5A and FIG. 5B completely implement all table look-up relationships defined by the pre-table shown in FIG. 3. As well, the sub-tables shown in FIG. 6A and FIG. 6B can completely implement all table look-up relationships defined by the post-table shown in FIG. 4.

In conclusion, a specification of the DVD system defines a pre-table and a post-table, as shown in FIG. 3 and FIG. 4, and an 8-bit input code is mapped to an 8-bit output code according to the pre-table and the post-table. In the prior method, each table shown in FIG. 3 and FIG. 4 comprises 256 kinds of table look-up relationships that are directly mapped. In the present invention, each of the pre-table and the post-table is implemented by combining two sub-tables. The two sub-tables shown in FIG. 5A and FIG. 5B are used to implement the pre-table with each sub-table only including sixteen kinds of the mapping relationships between an 4-bit input and an 4-bit output. As well, the two sub-tables shown in FIG. 6A and FIG. 6B are used to implement the post-table with each sub-table only including sixteen kinds of the mapping relationships between the 4-bit input and the 4-bit output . In contrast to the prior method, the present invention uses substantially simplified sub-tables to implement the completed pre-table and post-table.

The advantage of the present invention is more obvious when in gate count to perform the technology of the present invention, because each of the sub-tables only includes sixteen mapping relationships between an input and an output. In contrast to the prior method that directly implements all 256 kinds of mapping relationships between an 8-bit input and an 8-bit output, the number of logic gates used for performing the present invention is substantially reduced and the energy consumed is also reduced. Furthermore, the integration of the logic circuit is substantially improved, so the layout area is reduced. In practice, the layout area used for completely implementing all mapping relationships defined by the pre-table and the post-table in the present invention is only one-ninth of the layout area used in the prior method. The logic circuit of the present invention has more operation efficiency because of shorter gate delays by less logic gates. In testing the logic circuit in the present invention, only sixteen kinds of combinations of each sub-table are necessary to be tested for ensuing a normal operation of the present invention (all four sub-tables used for implementing the pre-table and the post-table just have a total of sixty-four kinds of combinations that need to be tested). By contrast, the prior method directly calculates 256 kinds of mapping relationships defined by each of the pre-table and the post-table, so a total of 512 kinds of mapping relationships need to tested for ensuring a normal operation of the logic circuit. Therefore, the present invention can also decrease production costs of logic circuits.

Figure 7A:
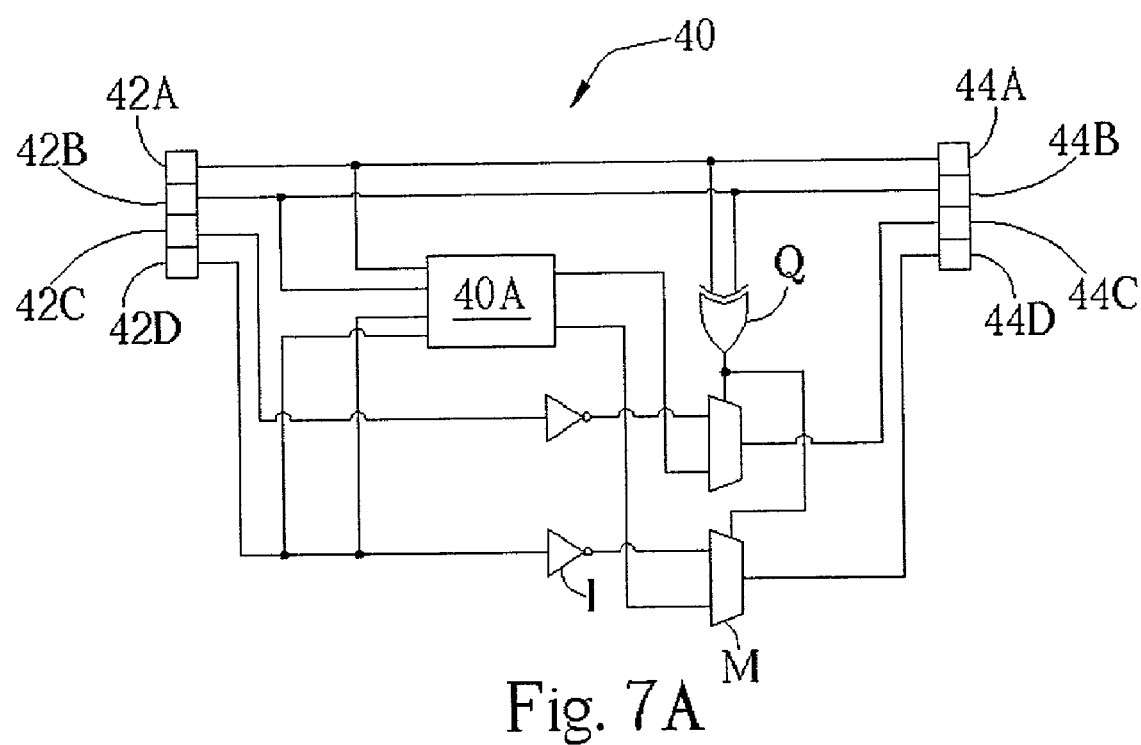
FIG. 7A and FIG. 7B are schematic diagrams of logic circuits used for calculating the two sub-tables shown in FIG. 5A and FIG. 5B, respectively.
Figure 7B:
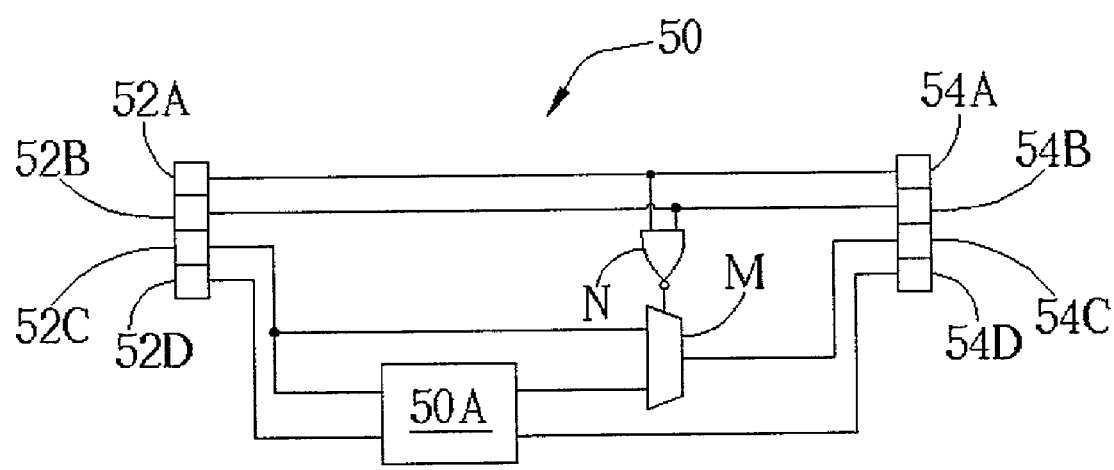

Please refer to FIG. 7A and FIG. 7B. In the above-mentioned description, the present invention uses the two sub-tables shown in FIG. 5A and FIG. 5B to completely implement all table look-up relationships defined by the pre-table shown in FIG. 3. FIG. 7A and FIG. 7B are schematic diagrams of logic circuits used for implementing the two sub-tables shown in FIG. 5A and FIG. 5B, respectively. The first encode unit 40 shown in FIG. 7A is used to implement the sub-table shown in FIG. 5A. Each sub-table of the present invention only includes sixteen mapping relationships between the input and the output, so the input of the first encode unit 40 is composed of four bits 42A, 42B, 42C, and 42D (as well as the first portion of the input code) and the output is composed of four bits 44A, 44B, 44C, and 44D (as well as the first sub-output code). The first encode unit 40 comprises a NOT gate I, an XOR gate Q, a multiplexer M, and a logic block 40A. As well, the second encode unit 50 of FIG. 7B used to implement the sub-table shown in FIG. 5B also has an input composed of four bits 52A, 52B, 52C, and 52D (as well as the second portion of the input code) and an output composed of four bits 54A, 54B, 54C, and 54D (as well as the second sub-output code). The second encode unit 50 comprises a NAND gate N, a multiplexer M, and a logic block 50A so as to implement the sixteen kinds of table look-up relationships shown in FIG. 5B.

Figure 8A:
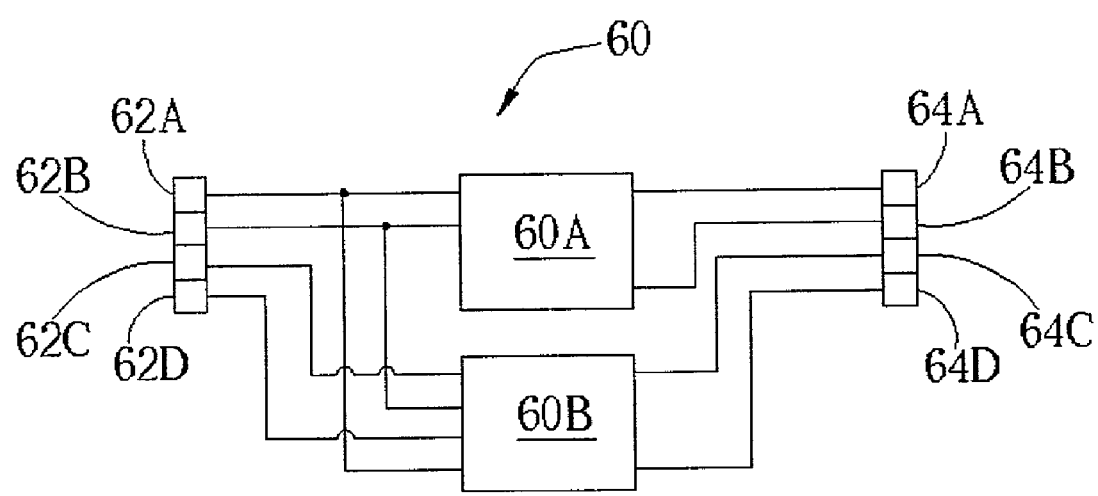
FIG. 8A and FIG. 8B are schematic diagrams of logic circuits used for calculating the two sub-tables shown in FIG. 6A and FIG. 6B, respectively.
Figure 8B:
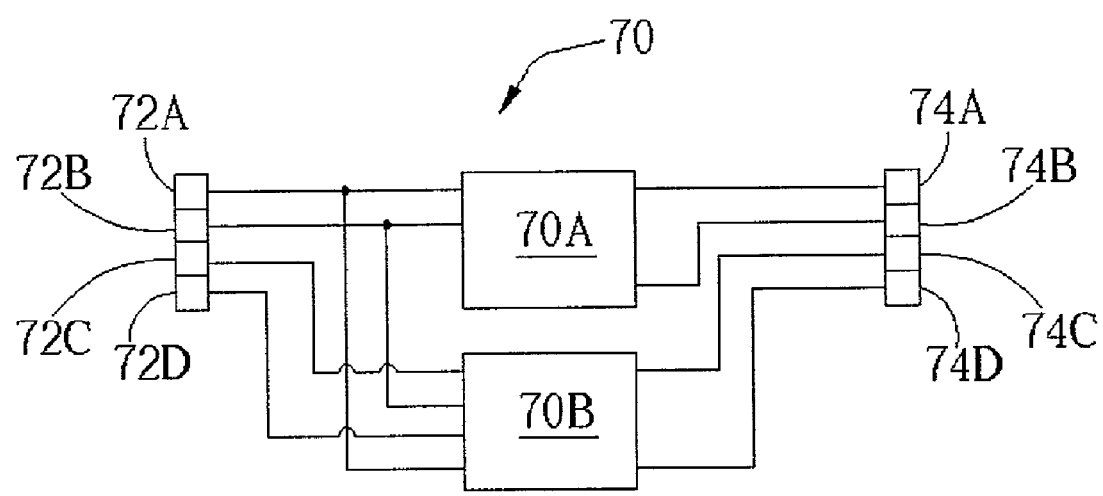

Please refer to FIG. 8A and FIG. 8B. The present invention uses the two sub-tables shown in FIG. 6A and FIG. 6B to completely implement all kinds of table look-up relationships defined by the post-table shown in FIG. 4, and the first encode unit 60 and the second encode unit 70 shown in FIG. 8A and FIG. 8B are used to implement the two sub-tables shown in FIG. 6A and FIG. 6B, respectively. The sub-table shown in FIG. 6A defines sixteen kinds of table look-up relationships between the 4-bit input (the first portion containing four bits) and the 4-bit output (the first sub-output code). Therefore, in the first encode unit 60, four bits 62A, 62B, 62C, and 62D are defined as the input and four bits 64A, 64B, 64C, and 64D are defined as the output. The first encode unit 60 uses logic blocks 60A, 60B to implement sixteen kinds of table look-up relationships. In the second encode unit 70 shown in FIG. 8B, four bits 72A, 72B, 72C, and 72D are defined as the input (the second portion of the input code) and four bits 74A, 74B, 74C, and 74D are defined as the output (the second sub-output code). The second encode unit 70 uses logic blocks 70A, 70B to implement sixteen kinds of table look-up relationships defined by the sub-table shown in FIG. 6B. However, the logic circuits used to calculate each sub-table of the present invention may have many different kinds of equivalent designs, and the above-mentioned description is just one of embodiments.

In a specification of the DVD system, the pre-table and the post-table, defined during authentication processes, comprise 256 kinds of table look-up relationships between the 8-bit input and the 8-bit output, respectively. In the above-mentioned description, the prior method directly uses logic circuits to calculate 256 kinds of table look-up relationships defined by each of the above-mentioned tables. Therefore, many logic gates and large layout areas are required. By contrast, the present invention discloses a method that uses two sub-tables to implement each of the pre-table and the post-table. Each sub-table only defines sixteen kinds of table look-up relationships between the 4-bit input and the 4-bit output, and 256 kinds of table look-up relationships defined by each of the pre-table and the post-table can be completely implemented through proper combination. Using the sub-tables disclosed by the present invention, one skilled person in designing logic circuits can easily use substantially simplified circuit designs to implement the pre-table and the post-table. Consequently, the disadvantages of the prior method, resulting in huge and complex logic circuits, can be improved. In the above-mentioned description, the DVD system performs authentication processes three times (a master controller authenticates a DVD drive, the DVD drive authenticates the master controller, and the DVD drive authenticates the master controller again), and the pre-table and the post-table are used each time in the authentication processes. Therefore, the present invention can be applied widely in each occurrence of the authentication processes.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An authentication method used in a digital versatile disk (DVD) system for generating an authentication code according to an inquiring code so as to authenticate a playback device, the inquiring code comprising a first portion and a second portion both with at least one bit; the method comprising:
generating a first sub-authentication code according to the first portion of the inquiring code;
generating a second sub-authentication code according to the second portion of the inquiring code; and
combining the first sub-authentication code and the second sub-authentication code to form the authentication code.

2. The authentication method of claim 1, wherein each of the inquiring code and the authentication code has bit length of eight, and each of the first portion of the inquiring code, the second portion of the inquiring code, the first sub-authentication code, and the second sub-authentication code has bit length of four.

3. The authentication method of claim 2, wherein a mapping relationship between the first sub-authentication code, the second sub-authentication code, and the authentication code conforms to a pre-table defined in a specification of the digital versatile disk system.

4. The authentication method of claim 2, wherein a mapping relationship between the first sub-authentication code, the second sub-authentication code, and the authentication code conforms to a post-table defined in a specification of the digital versatile disk system.

5. An authentication circuit used in an authentication process of a digital versatile disk (DVD) system for generating an authentication code according to an inquiring code so as to authenticate a playback device, the inquiring code comprising a first portion and a second portion both with at least one bit;
the authentication circuit comprising:
a first encoder for generating a first sub-authentication code according to only the first portion of the inquiring code; and
a second encoder for generating a second sub-authentication code according to only the second portion of the inquiring code;
wherein the authentication code is generated according to the first sub-authentication code and the second sub-authentication code.

6. The authentication circuit of claim 5, wherein each of the inquiring code and the authentication code has bit length of eight, and each of the first portion of the inquiring code, the second portion of the inquiring code, the first sub-authentication code, and the second sub-authentication code has bit length of four.

7. The authentication circuit of claim 6, wherein a mapping relationship between the first sub-authentication code, the second sub-authentication code, and the authentication code conforms to a pre-table defined in a specification of the digital versatile disk system.

8. The authentication circuit of claim 6, wherein a mapping relationship between the first sub-authentication code, the second sub-authentication code, and the authentication code conforms to a post-table defined in a specification of the digital versatile disk system.

* * * * *